(No Model.)
J. A. JUST.
PROCESS OF MAKING CHLORINE.
No. 495,462. Patented Apr. 11, 1893.
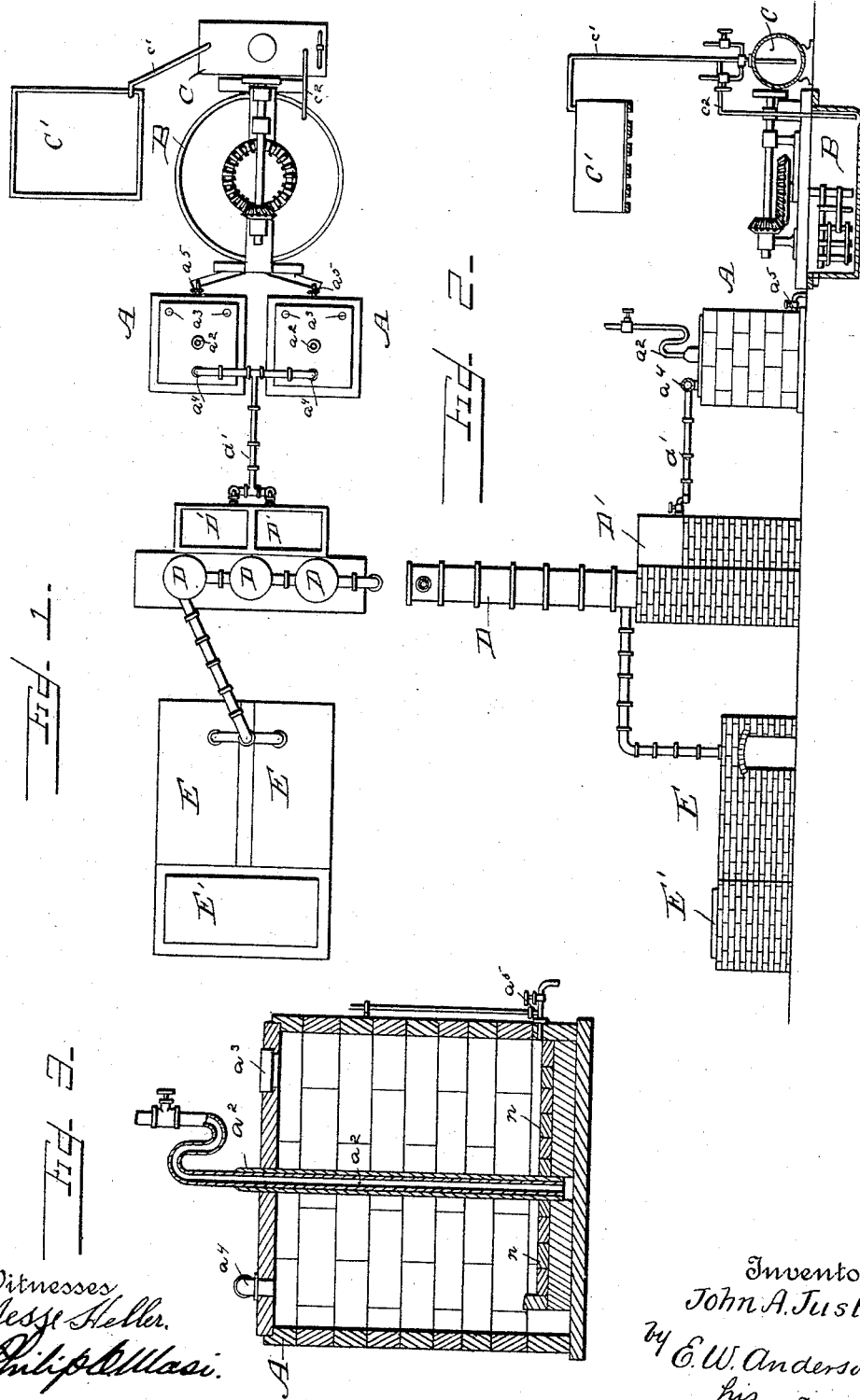
Witnesses
Jesse Heller.
Philip A. Masi.
Inventor
John A. Just.
by E. W. Anderson
his Attorney

UNITED STATES PATENT OFFICE.

JOHN A. JUST, OF SYRACUSE, ASSIGNOR OF ONE-HALF TO ADDICE E. DEWEY, OF WATERTOWN, NEW YORK.

PROCESS OF MAKING CHLORINE.

SPECIFICATION forming part of Letters Patent No. 495,462, dated April 11, 1893.

Application filed February 29, 1892. Renewed March 9, 1893. Serial No. 465,238. (No specimens.)

*To all whom it may concern:*

Be it known that I, JOHN A. JUST, a citizen of the United States, and a resident of Syracuse, in the county of Onondaga and State of New York, have invented certain new and useful Improvements in Processes of Manufacturing Chlorine; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view of the apparatus. Fig. 2 is a sectional view of one of the stills. Fig. 3 is an elevation of the apparatus.

This invention has relation to certain new and useful improvements in the manufacture of chlorine from hydrochloric acid by the aid of manganese dioxide and nitric acid, and it consists in the novel steps, and combination of steps, as hereinafter fully described and pointed out in the claims.

The prime objects of the invention are, first, to increase the percentage of chlorine obtained from the hydrochloric acid; second, to conduct the process in such a manner as to prevent the escape of nitrogen compounds with the chlorine; third, to provide for the continuous recovery for re-use of the manganese dioxide and nitric acid. Other objects will hereinafter appear.

In carrying out my process, certain mechanical devices are employed, which will be described as follows:

In the accompanying drawings, the letters A, A, designate two stills, usually made of sandstone, and boiled in tar, which renders them impervious to attack of acid. The stills are put together in the manner shown in detail in Fig. 1.

$a'$ is the gas inlet, $a^2$ steam pipe, $a^3$ manholes for charging the manganese oxide, $a^4$ the acid inlet, and $a^5$ a gage cock with a strong glass tube to indicate the level of the liquid within the still, when it is being filled.

B is a neutralizing well made of sandstone, also previously boiled in tar, and set in pitch and sand, so as to be also impervious and acid proof. The purpose of this neutralizing well is to receive the discharged residue liquor from the stills A, A, when the charge therein has been finished. This residue always contains a little free acid, and is neutralized by manganese hydroxide, protoxide, or carbonate, as will be hereinafter more fully described. This neutralizing well is connected by means of a pipe $c^2$, dipping into the well to near the bottom thereof, to a vacuum chamber C. Whenever the liquor within the well has become neutralized, it is drawn into the vessel C by means of vacuum, and forced by pressure into an iron tank $C'$ called a "settler," which is usually of sufficient capacity to hold a day's residue, and into another tank or settler (not shown) from which the residue liquor is run to a concentrating pan $E'$. This pan is heated by the waste heat of furnaces E, E, which serve to boil down the residue liquor to dryness, and thus recover the material, as hereinafter described.

D, D, D are condensing towers for nitric acid, and are made of chemical stoneware. $D'$ is a double cistern, made of sandstone boiled in tar and joined either by rubber gaskets or by clay and tar cement. These cisterns receive the nitric acid, which is condensed within the towers, and flows off near the bottom. $d'$ is a pipe line leading from the cistern $D'$ to the stills, and serves to conduct the recovered nitric acid to the still for re-use.

Having thus described the apparatus, &c., by means of which my process is carried into practice, I will now proceed to describe the steps and operation of the process proper.

In the stills A, A, I place a charge of hydrochloric acid, usually about six-thousand (6,000) pounds, and the equivalent of manganese dioxide, for each step, with a slight excess, or in all a little more than twice the equivalent of the hydrochloric acid. This manganese is placed upon a stone grate $n, n$, near the bottom of the stills. Decomposition takes place, and chlorine is at first freely given off. Toward the last however, in order to produce complete decomposition, some heat is required, and this is supplied by steam, which is blown into the mixture through the steam pipe $a^2$. When complete decomposition is reached, sufficient nitric acid is run into the still to decompose the manganous chloride formed by the first step and also the residue of the manganese dioxide originally added. This liberates the balance of the chlorine contained in the mixture, and fully ninety per cent. of it is obtained as bleaching powder (chloride of lime) against twenty eight (28) to thirty three (33) per cent. by the Weldon process now used in Europe. The nitric acid employed, together with the manganese are contained in the residue liquor as manganous nitrate from which both manganese dioxide and nitric acid are recovered in the subsequent steps of the process, as presently described. The chemical reactions which take place during the above steps are expressed in the following equations:

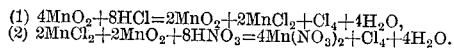

(1) $4MnO_2 + 8HCl = 2MnO_2 + 2MnCl_2 + Cl_4 + 4H_2O$,
(2) $2MnCl_2 + 2MnO_2 + 8HNO_3 = 4Mn(NO_3)_2 + Cl_4 + 4H_2O$.

From these equations it will be seen that there is a sufficient excess of the manganese dioxide present in the second reaction to convert the liberated hydrochloric acid into chlorine and water.

In Letters Patent of the United States, numbered 391,159, issued to me October 16, 1888, for process of manufacturing chlorine, I place the hydrochloric and nitric acids and manganese dioxide in the still together, and heat (the therein described stoneware stills, placed in calcium chloride bath) by means of the heated calcium chloride.

In practice upon a large scale, where it greatly depends upon the skill and good will of workmen, I find the following advantages by dividing the first operation into two steps, as above described, wherein the nitric acid is not present, until after the completion of the reaction of the manganese dioxide and hydrochloric acid. Although the same reactions occur when nitric acid is first present, there is danger of losing nitrogen compounds; for, if the temperature is raised above a certain degree, especially in the first part of the operation (in carrying out the two steps in one), some nitrogen compounds escape with the chlorine. This cannot occur when the nitric acid is subsequently added, though the heat be raised to any degree possible under the circumstances. The charge also takes less heat to complete, yields a more neutral liquor, and gives speedier operation, which are sufficient to demonstrate the practical and economic results of the process. After the first two steps are completed within the still, and all the chlorine liberated, the resulting residue liquor, consisting of manganese nitrate solution, with a trace of free nitric acid, is run into the neutralizing well B, where it is neutralized by manganese hydroxide, protoxide or carbonate. When this liquor has become neutralized, which usually requires very little of the manganese protoxide or hydroxide, owing to the fact that the recovered manganese dioxide is extremely soft and porous, and consequently easily soluble, it is raised through pipe $c^2$ into the vacuum chamber C, and by cutting off the vacuum when C is filled with liquor, and putting air pressure into same, the liquor is forced through pipe $c$ to the settler C'. The neutral manganese nitrate liquor from the settler C' is then run to the concentrating pan E', where the excess of water is evaporated, over and above that which is required for condensing the nitrogen compounds of nitric acid of a strength as used, 33° to 34° Baumé or about forty-seven to fifty per cent. $HNO_3$. This is judged by evaporating the manganous nitrate liquor to a thick creamy consistence.

The concentrating pan is heated by the waste heat from the drying down furnaces E, E, as hereinbefore referred to. As soon as the proper consistency of the manganous nitrate is reached, it is removed to the furnaces E, E, which are worked alternately to keep a constant flow of gases going to the condensers. The manganous nitrate is dried and calcinated by the heat in E, E, giving off the gases, which already mixed with air and water are completely recovered and condensed in the towers D. The manganese dioxide formed is found upon the furnace bottom, so that both the nitric acid and manganese dioxide are continuously recovered for re-use.

It is obvious that the form and arrangement of the apparatus employed, as herein described, may be varied somewhat without departing from the spirit and scope of the invention.

Having described this invention, what I claim as new, and desire to secure by Letters Patent, is—

1. The process of manufacturing chlorine, which consists in first placing hydrochloric acid and double the equivalent of manganese dioxide with a slight excess in a still or suitable receptacle, and completely decomposing it by the aid of heat; second, subsequently adding sufficient nitric acid to decompose the manganous chloride formed by the first step and also the residual manganese dioxide; third, transferring the residue of the manganous nitrate liquor to a neutralizing receptacle, and neutralizing it; fourth, transferring it to a settling tank; fifth, transferring said neutralized residue liquor to a concentrator and concentrating it, sixth; transferring the concentrated solution to decomposing furnaces or retorts, and drying and decomposing it, and finally condensing the evolved gases, substantially as specified.

2. The herein described steps in the manufacture of chlorine, as follows: first placing a charge of hydrochloric acid, and double the equivalent of manganese dioxide with a slight excess in a still, and completely decomposing it by the aid of heat; second, subsequently adding, while in the still, sufficient nitric acid to decompose the remaining manganese dioxide and the manganous chloride produced by the first step, substantially as specified.

3. The herein described steps in the manufacture of chlorine, as follows: transferring from the still after the liberation of the chlorine, the residual manganous nitrate liquor to a neutralizing well, and neutralizing by the aid of manganese protoxide, hydroxide, or carbonate, and subsequently transferring,—settling, evaporating, calcining, and condensing the gases from said residue, substantially as specified.

4. The herein described steps in the manufacture of chlorine, consisting in removing from the still, after the liberation of the chlorine, the residual manganous nitrate liquor to a neutralizing well and neutralizing by the aid of manganese protoxide, hydroxide or carbonate, transferring said residual neutralized liquor by suction and pressure to a settling tank or receptacle, subsequently transferring the liquor to an evaporator or concentrator worked by the waste heat of the furnaces, transferring the concentrated solution to the calcining furnaces or retorts, and finally condensing the evolved gases mixed with air and water in condensing towers, and recovering them as nitric acid, substantially as specified.

In testimony whereof I affix my signature in presence of two witnesses.

JOHN A. JUST.

Witnesses:
FRANK PIERCE,
F. E. REID.